United States Patent
Kurematsu

(10) Patent No.: US 9,651,121 B2
(45) Date of Patent: May 16, 2017

(54) CHAIN GUIDE MECHANISM

(71) Applicant: TSUBAKIMOTO CHAIN CO., Osaka-shi, Osaka (JP)

(72) Inventor: Yuji Kurematsu, Osaka (JP)

(73) Assignee: TSUBAKIMOTO CHAIN CO., Osaka-shi, Osaka (JP)

( * ) Notice: Subject to any disclaimer, the term of this patent is extended or adjusted under 35 U.S.C. 154(b) by 181 days.

(21) Appl. No.: 14/336,745

(22) Filed: Jul. 21, 2014

(65) Prior Publication Data

US 2015/0045164 A1 Feb. 12, 2015

(30) Foreign Application Priority Data

Aug. 6, 2013 (JP) ................ 2013-163208

(51) Int. Cl.
*F16H 7/08* (2006.01)
*F16H 7/18* (2006.01)

(52) U.S. Cl.
CPC ............ *F16H 7/08* (2013.01); *F16H 7/18* (2013.01); *F16H 2007/0821* (2013.01); *F16H 2007/0874* (2013.01); *F16H 2007/0893* (2013.01); *F16H 2007/185* (2013.01)

(58) Field of Classification Search
CPC ...... F16H 7/08; F16H 7/18; F16H 2007/0821; F16H 2007/0842; F16H 2007/0872; F16H 2007/0874; F16H 2007/0893; F16H 2007/185
See application file for complete search history.

(56) References Cited

U.S. PATENT DOCUMENTS 1,363,015 A * 12/1920 Roberts ................ F16H 7/1254
474/132
2,098,573 A * 11/1937 Dingle .................... B42B 4/00
198/814
3,245,277 A * 4/1966 Ward ..................... F16H 7/129
474/132

(Continued)

FOREIGN PATENT DOCUMENTS

CN 201953928 U 8/2011
JP S60-40848 U 3/1985

(Continued)

OTHER PUBLICATIONS

Office Action dated Jul. 6, 2016 in corresponding Japanese application No. 2013-163208. With English Machine translation of corresponding portions related to Jap. S60-40848 cited above.

*Primary Examiner* — Minh Truong
(74) *Attorney, Agent, or Firm* — Westerman, Hattori, Daniels & Adrian, LLP

(57) ABSTRACT

The chain guide mechanism includes a slack side guide, a tension side guide, and a link member that is capable of rotating about a predetermined rotary shaft provided so as to be fixed to an attachment subject. The link member includes a slack side pivot portion attached rotatably to the slack side guide, and the slack side pivot portion is disposed on an opposite side of the chain that is guided by the slack side guide to the predetermined rotary shaft, and in a lower position than the predetermined rotary shaft. The slack side guide is biased by its own weight toward a side of the chain that is guided by the slack side guide.

3 Claims, 11 Drawing Sheets

(56) References Cited

U.S. PATENT DOCUMENTS

| | | | | |
|---|---|---|---|---|
| 4,850,934 | A * | 7/1989 | Gibson, Jr. | F16H 7/08 474/111 |
| 6,322,469 | B1 * | 11/2001 | Markley | F16H 7/1236 474/110 |
| 7,429,226 | B2 * | 9/2008 | Tryphonos | F01L 1/024 474/109 |
| 7,476,168 | B2 * | 1/2009 | Markley | F16H 7/0829 474/111 |
| 7,815,533 | B2 * | 10/2010 | Vrsek | F01L 1/348 474/109 |
| 2012/0225744 | A1 * | 9/2012 | Markley | F16H 7/08 474/111 |
| 2013/0023367 | A1 * | 1/2013 | Markley | F16H 7/08 474/111 |
| 2013/0059686 | A1 | 3/2013 | Markley et al. | |

FOREIGN PATENT DOCUMENTS

| | | |
|---|---|---|
| JP | 10-089428 A | 4/1998 |
| JP | 2013-526690 A | 6/2013 |

\* cited by examiner

CHAIN GUIDE MECHANISM

BACKGROUND OF THE INVENTION

1. Field of the Invention

The present invention relates to a chain guide mechanism for guiding a chain, and more particularly to a chain guide mechanism for a timing system.

2. Description of the Related Art

A conventional chain guide mechanism for a timing system is disposed in an engine room of an automobile in order to guide a chain that travels between sprockets by sliding against the chain while maintaining a chain tension at an appropriate level (see Japanese Patent Application Publication H10-89428, for example).

As shown in FIG. 11, the conventional chain guide 500 includes a slack side guide (a swinging guide) 510 that is attached swingably to an engine block (not shown) serving as an attachment subject on a slack side of a chain travel line, and a tension side guide (a fixed guide) 520 that is fixed to the engine block on a tension side of the chain travel line.

SUMMARY OF THE INVENTION

An object of the conventional chain guide mechanism 500, however, is to absorb elongation of a chain CH, vibration of the chain CH, and rattling of the chain CH by maintaining the chain tension at an appropriate level, and for this purpose, as shown in FIG. 11, a tensioner T is provided to bias the slack side guide (the swinging guide) 510 toward the chain CH side. By disposing the tensioner T, however, a cost increase is incurred, and it becomes more difficult to achieve a reduction in weight.

Further, as shown in FIG. 11, a plunger T1 constituting the tensioner T must have a sufficient length to be able to respond to elongation of the chain CH, and therefore a large enough space to dispose the tensioner T must be secured in the engine, with the result that the size of the engine cannot be reduced.

Furthermore, a hydraulic tensioner T is often used as the tensioner T disposed in the engine, but when a hydraulic tensioner T is used, problems cited below arise.

When a hydraulic tensioner T is used, a large amount of processing must be performed on the engine side to form engine side oil passages and the like, leading to an increase in cost. Further, an output of an oil pump (not shown) must be increased in order to supply oil to the hydraulic tensioner T, leading to an increase in friction. Furthermore, when the engine is started, a time lag occurs from engine startup to a point at which oil pressure is supplied to the hydraulic tensioner T, and as a result of this time lag, abnormal noise is likely to occur. Moreover, when the oil pressure supplied from the oil pump is too high, increases in chain meshing noise and friction occur, and when the oil pressure supplied from the oil pump is too low, rattling and abnormal noise occur in the chain CH. Further, when foreign matter becomes intermixed in engine oil, a blockage can easily occur in the hydraulic tensioner T, and as a result, an oil pressure maintenance function is impaired, leading to an increase in the likelihood of abnormalities such as abnormal engine noise. Furthermore, when the engine oil deteriorates, constituent components of the tensioner T become worn, and as a result, the oil pressure maintenance function is impaired, leading to an increase in the likelihood of abnormalities such as abnormal engine noise. Moreover, the hydraulic tensioner T may be provided with a ratchet (not shown) that restricts movement of the plunger T1 with the aim of reducing abnormal noise during engine startup, but in this case, chain meshing noise and an increase in friction are likely to occur due to excessive jumping of the ratchet.

An object of the present invention is to solve the problems described above by providing a chain guide mechanism with which a chain tension is maintained at an appropriate level so as to realize smooth chain travel while achieving reductions in cost, weight, engine size, and abnormal noise.

The present invention solves the problems described above by providing a chain guide mechanism for guiding a chain, including: a slack side guide disposed on a slack side of a chain travel line; a tension side guide disposed on a tension side of the chain travel line; and a link member that is capable of rotating about a predetermined rotary shaft provided so as to be fixed to an attachment subject of the chain guide mechanism, wherein the link member includes a slack side pivot portion attached rotatably to the slack side guide, the slack side pivot portion is disposed on an opposite side of the chain that is guided by the slack side guide to the predetermined rotary shaft, and in a lower position than the predetermined rotary shaft, and the slack side guide is biased by a weight thereof toward a side of the chain that is guided by the slack side guide.

In the invention according some embodiments, the link member is provided to be capable of rotating about the predetermined rotary shaft, which is provided so as to be fixed to the attachment subject of the chain guide mechanism. The link member includes the slack side pivot portion attached rotatably to the slack side guide, and the slack side pivot portion is disposed on the opposite side of the side of the chain that is guided by the slack side guide to the predetermined rotary shaft, and in a lower position than the predetermined rotary shaft. Further, the slack side guide is biased by its own weight toward the side of the chain that is guided by the slack side guide. Hence, a pressing force can be applied to the chain from the slack side guide using the weight of the slack side guide itself, i.e. without providing a tensioner that presses the slack side guide, and as a result, the chain tension can be maintained at an appropriate level so as to realize smooth chain travel while achieving reductions in cost, weight, engine size, and abnormal noise.

Further, in the invention according to other embodiments, the slack side guide does not have to be attached to an attachment subject such as an engine block, and therefore the attachment subject does not have to be subjected to processing for attaching the slack side guide, such as forming an attachment holt bearing surface and so on. As a result, a reduction in cost can be achieved, and an operation for attaching the slack side guide to an attachment subject such as an engine block can be omitted.

In an invention according to other embodiments, the shaft member for attaching the tension side guide to the attachment subject is used as the rotary shaft of the link member, thereby eliminating the need to provide a separate rotary shaft for the link member. As a result, a reduction in cost can be achieved, and an operation load for attaching the chain guide mechanism to an attachment subject such as an engine block can be lightened.

In an invention according to other embodiments, the second link member that is capable of rotating about the predetermined second rotary shaft is attached rotatably to the slack side guide in addition to the link member, and therefore swinging of the slack side guide about an attachment location between the link member and the slack side guide can be suppressed. As a result, an attitude of the slack side guide relative to the chain can be stabilized.

In an invention according to other embodiments, the second link member is attached rotatably to the slack side guide and the tension side guide, and therefore movement of the slack side guide and the tension side guide can be coordinated by the second link member. As a result, tension variation can be canceled out by a phase difference between a tension on the slack side and a tension on the tension side.

In an invention according to other embodiments, the second shaft member for attaching the tension side guide to the attachment subject is used as the second rotary shaft of the second link member, thereby eliminating the need to provide a separate second rotary shaft for the second link member. As a result, a reduction in cost can be achieved, and an operation load for attaching the chain guide mechanism to an attachment subject such as an engine block can be lightened.

In an invention according to other embodiments, the weighting member attached to the slack side guide is provided, and therefore a balance between the pressing force exerted on the chain from the slack side guide using the weight of the slack side guide itself and a force received by the slack side guide due to friction between the traveling chain and the slack side guide can be adjusted easily.

DESCRIPTION OF THE PREFERRED EMBODIMENTS

As long as a chain guide mechanism according to the present invention is a chain guide mechanism for guiding a chain, including: a slack side guide disposed on a slack side of a chain travel line; a tension side guide disposed on a tension side of the chain travel line; and a link member that is capable of rotating about a predetermined rotary shaft provided so as to be fixed to an attachment subject of the chain guide mechanism, wherein the link member includes a slack side pivot portion attached rotatably to the slack side guide, the slack side pivot portion is disposed on an opposite side of the chain that is guided by the slack side guide to the predetermined rotary shaft, and in a lower position than the predetermined rotary shaft, and the slack side guide is biased by a weight thereof toward a side of the chain that is guided by the slack side guide, thereby providing a chain guide mechanism with which a chain tension is maintained at an appropriate level so as to realize smooth chain travel while achieving reductions in cost, weight, engine size, and abnormal noise, there are no limitations on a specific configuration thereof.

For example, a guide main body of a guide is preferably made of a metallic material, and particularly preferably manufactured from rolled steel plate. However, an appropriate conventional material may be selected in accordance with conditions relating to weight, rigidity, durability, moldability, cost, and so on.

Further, a shoe of the guide is preferably formed from a synthetic resin material, but an appropriate conventional material may be selected in accordance with conditions relating to frictional resistance, rigidity, durability, moldability, cost, and so on.

Furthermore, an appropriate conventional material such as metal or synthetic resin may be selected as the material of a link member in accordance with conditions relating to rigidity, durability, moldability, cost, and so on.

Moreover, the guide main body and the shoe of the guide may be formed integrally.

Further, as regards a specific configuration for a rotary shaft of an upper side link member, any configuration may be employed as long as the rotary shaft is provided so as to be fixed to an attachment subject such as an engine block. In the embodiments to be described below, for example, a tension side upper side shaft member for attaching a tension side guide to the engine block is used as the rotary shaft. However, the rotary shaft of the upper side link member may be provided separately to the tension side upper side shaft member.

Embodiments

A chain guide mechanism 100 according to a first embodiment of the present invention will be described below on the basis of FIGS. 1 to 3.

Figure 1:
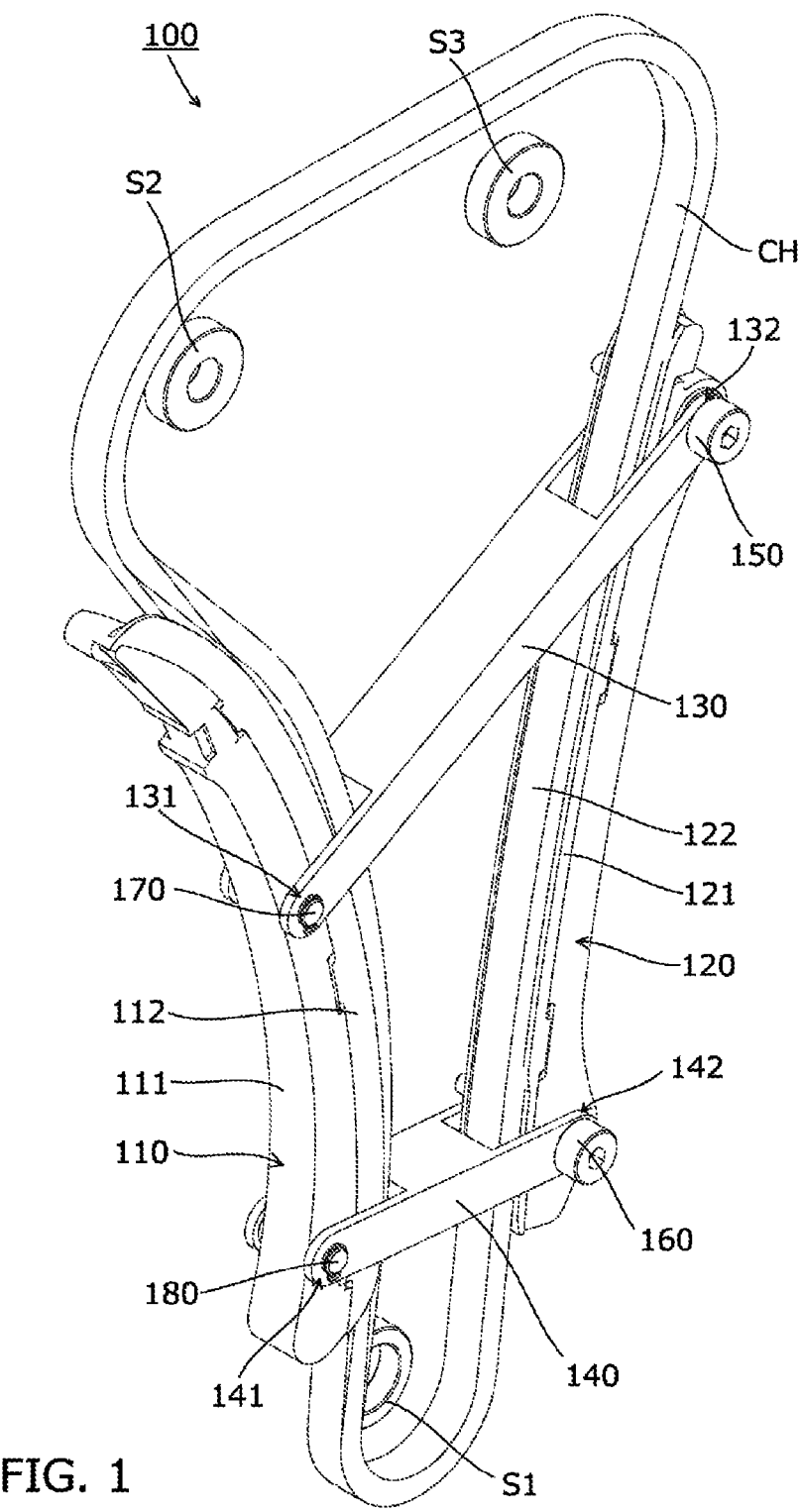
FIG. 1 is a perspective view showing a chain guide mechanism according to a first embodiment.
Figure 2:
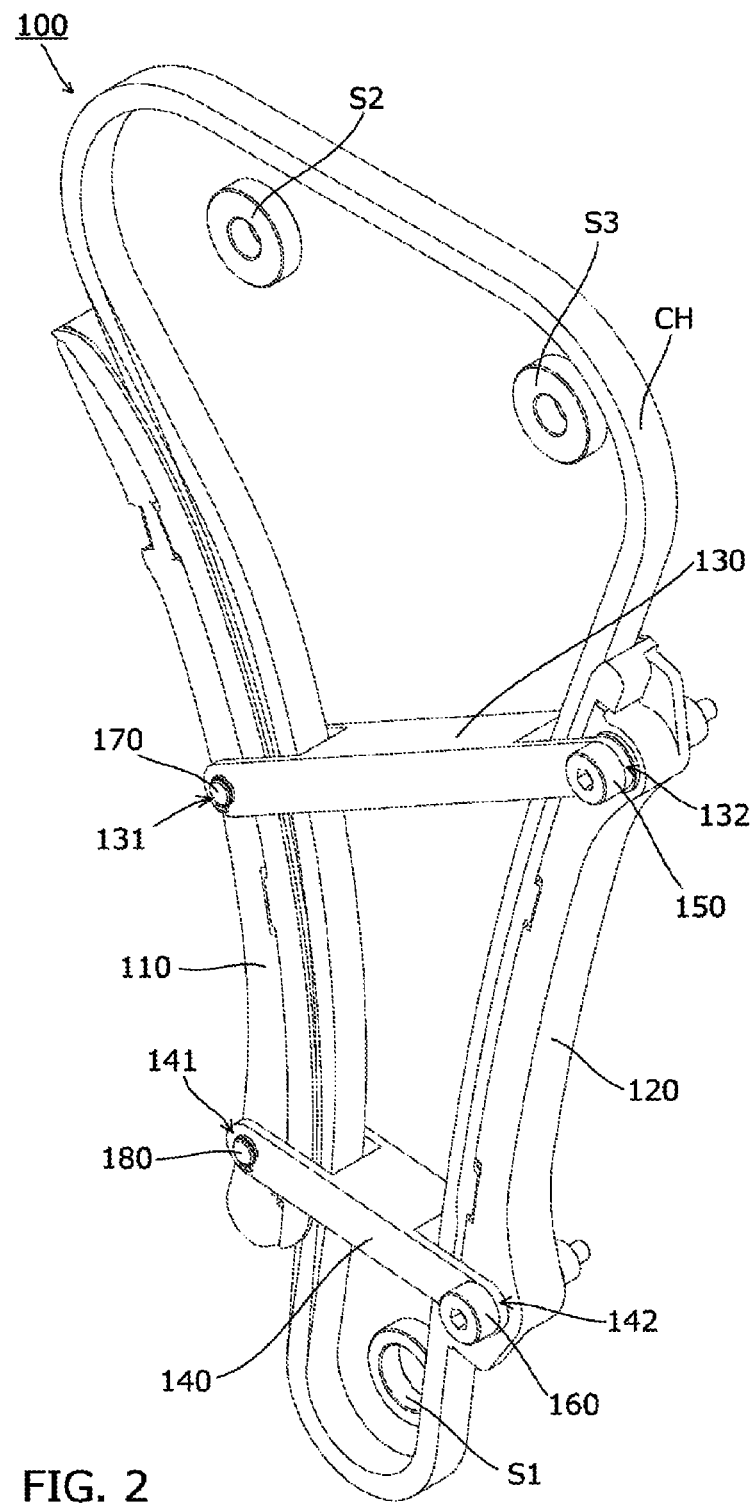
FIG. 2 is a perspective view showing the chain guide mechanism according to the first embodiment from a different angle to FIG. 1.
Figure 3:
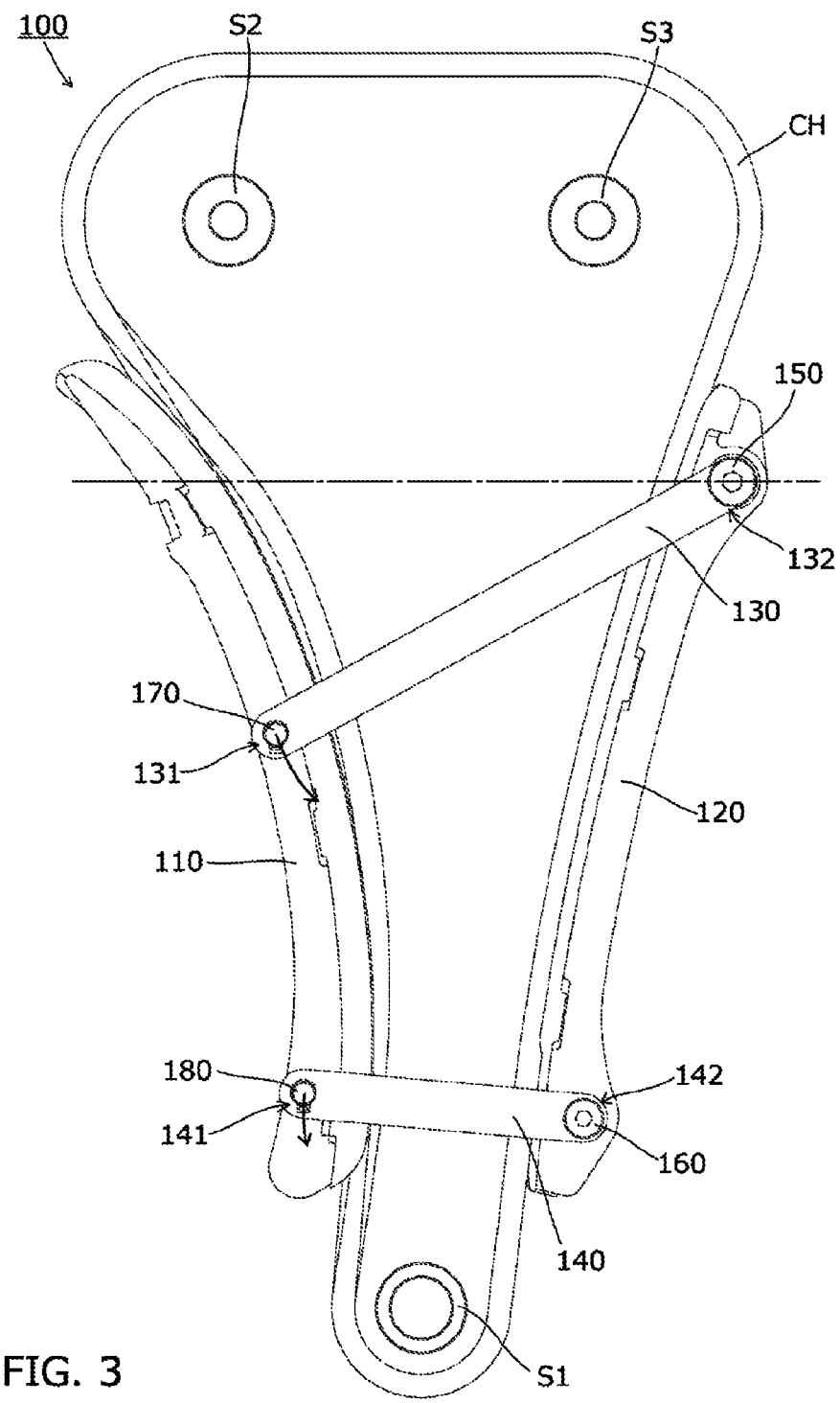
FIG. 3 is a plan view showing the chain guide mechanism according to the first embodiment.

As shown in FIGS. 1 to 3, the chain guide mechanism 100 according to the first embodiment of the present invention is a chain guide mechanism for a timing system, which is disposed in an engine room in order to guide a chain CH that travels between sprockets S1 to S3 provided respectively on a crankshaft and a camshaft by sliding against the chain CH while maintaining a chain tension at an appropriate level.

As shown in FIGS. 1 to 3, the chain guide mechanism 100 includes a slack side guide 110 disposed on a slack side of a chain travel line, a tension side guide 120 disposed on a tension side of the chain travel line, and an upper side link member 130 and a lower side link member 140 connecting the slack side guide 110 to the tension side guide 120.

As shown in FIG. 1, the slack side guide 110 includes a metal slack side guide main body 111 that extends in a chain travel direction, and a slack side shoe 112 made of a synthetic resin material, which is attached to the slack side guide main body 111 in order to guide the traveling chain CH by sliding against the chain CH. In this embodiment, the slack side guide 110 is supported by the upper side link member 130 and the lower side link member 140 rather than being attached directly to an engine block (not shown) serving as an attachment subject of the chain guide mechanism 100.

As shown in FIG. 1, the tension side guide 120 includes a metal tension side guide main body 121 that extends in the chain travel direction, and a tension side shoe 122 made of a synthetic resin material, which is attached to the tension side guide main body 121 in order to guide the traveling chain CH by sliding against the chain CH. As shown in FIGS. 1 to 3, the tension side guide 120 is fixed to the engine block by a tension side upper side shaft member 150 and a tension side lower side shaft member 160, to be described below.

As shown in FIGS. 1 to 3, the upper side link member 130 is formed from a synthetic resin material, and includes a slack side upper side pivot portion 131 on one end side thereof and a tension side upper side pivot portion 132 on another end side thereof.

The slack side upper side pivot portion 131 is attached rotatably to the slack side guide 110 by a slack side upper side shaft member 170 that is inserted into a shaft hole (not shown) formed in the slack side upper side pivot portion 131 and a shaft hole (not shown) formed in the vicinity of a center of the slack side guide 110. Note that the slack side upper side shaft member 170 is not fixed to the engine block.

The tension side upper side pivot portion 132 is attached rotatably to the tension side guide 120 by the tension side upper side shaft member 150, which is inserted into a shaft hole (not shown) formed in the tension side upper side pivot portion 132 and a shaft hole (not shown) formed in the vicinity of an upper end of the tension side guide 120. The tension side upper side shaft member 150 is fixed to a shaft member bearing surface (not shown) formed on the engine block.

As shown in FIG. 3, the slack side upper side pivot portion 131 (the slack side upper side shaft member 170) and the tension side upper side pivot portion 132 (the tension side upper side shaft member 150) are disposed on opposite sides of the chain CH guided by the slack side guide 110. Further, in a condition where the timing system is attached to the engine block, as shown in FIG. 3, the slack side upper side pivot portion 131 (the slack side upper side shaft member 170) is disposed in a lower position than the tension side upper side pivot portion 132 (the tension side upper side shaft member 150).

As shown in FIGS. 1 to 3, the lower side link member 140 is formed from a synthetic resin material and disposed on a lower side of the upper side link member 130. The lower side link member 140 includes a slack side lower side pivot portion 141 on one end side thereof and a tension side lower side pivot portion 142 on another end side thereof.

The slack side lower side pivot portion 141 is attached rotatably to the slack side guide 110 by a slack side lower side shaft member 180 that is inserted into a shaft hole (not shown) formed in the slack side lower side pivot portion 141 and a shaft hole (not shown) formed in the vicinity of a lower end of the slack side guide 110. Note that the slack side lower side shaft member 180 is not fixed to the engine block.

The tension side lower side pivot portion 142 is attached rotatably to the tension side guide 120 by the tension side lower side shaft member 160, which is inserted into a shaft hole (not shown) formed in the tension side lower side pivot portion 142 and a shaft hole (not shown) formed in the vicinity of a lower end of the tension side guide 120. The tension side lower side shaft member 160 is fixed to a shaft member bearing surface (not shown) formed on the engine block.

As shown in FIG. 3, the slack side lower side pivot portion 141 (the slack side lower side shaft member 180) and the tension side lower side pivot portion 142 (the tension side lower side shaft member 160) are disposed at substantially identical heights in a condition where the timing system is attached to the engine block.

Next, an operation of the chain guide mechanism 100 will be described.

First, during an engine stoppage (when the chain CH is not traveling), as shown in FIGS. 1 to 3, the slack side guide 110 is biased toward the chain CH side by its own weight so as to lean toward the chain CH.

Further, during an engine operation (when the chain CH travels), the slack side guide 110 receives a force in a direction for separating the slack side guide 110 from the chain CH due to friction between the chain CH and the slack side shoe 112 of the slack side guide 110, but since the slack side guide 110 is biased toward the chain CH side by its own weight, as described above, the slack side guide 110 guides the chain CH in a position where a counterbalance is achieved between the force generated by this friction and a force generated by the weight of the slack side guide 110 itself.

Figure 4:
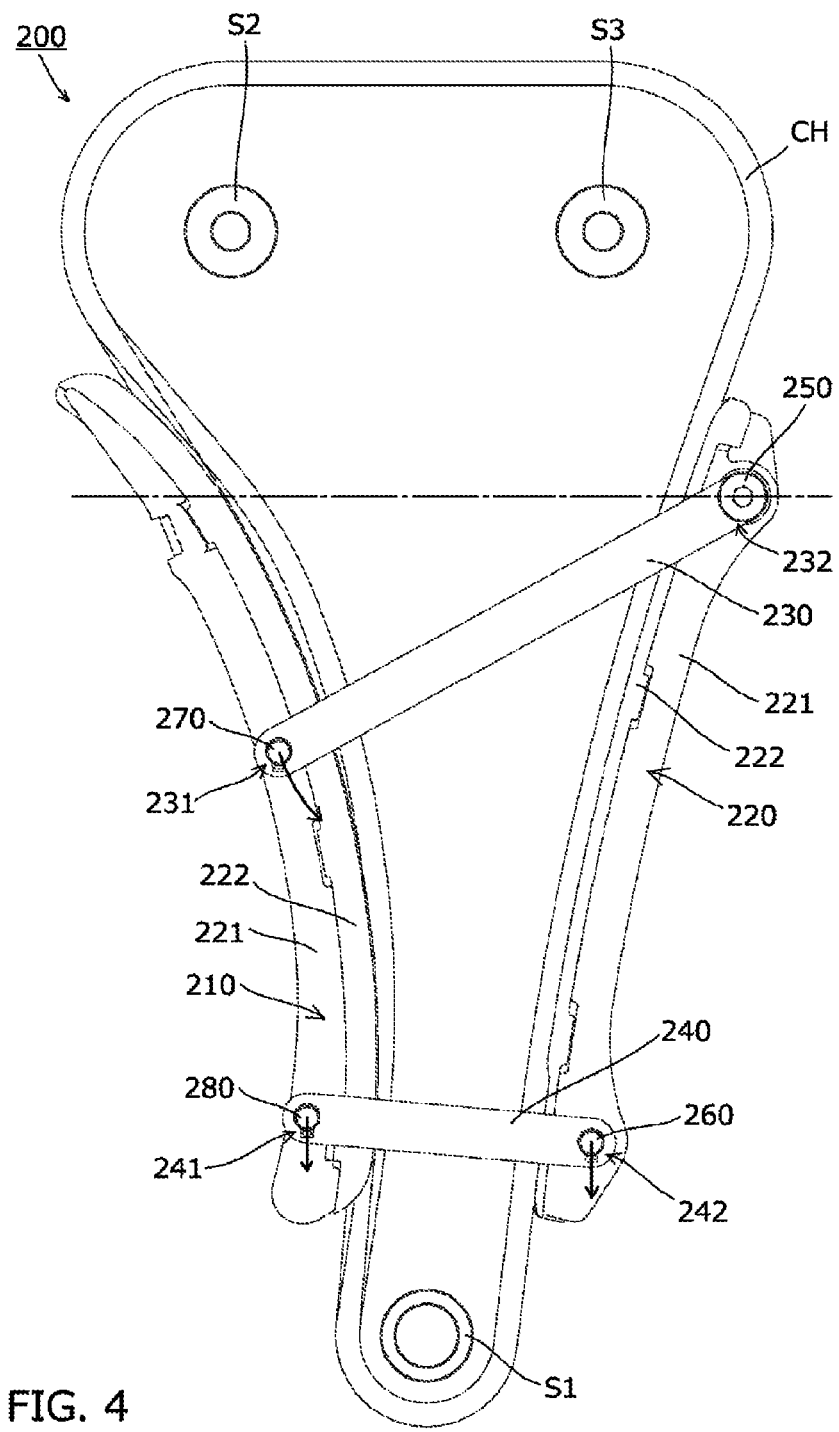
FIG. 4 is a plan view showing a chain guide mechanism according to a second embodiment.
Figure 5:
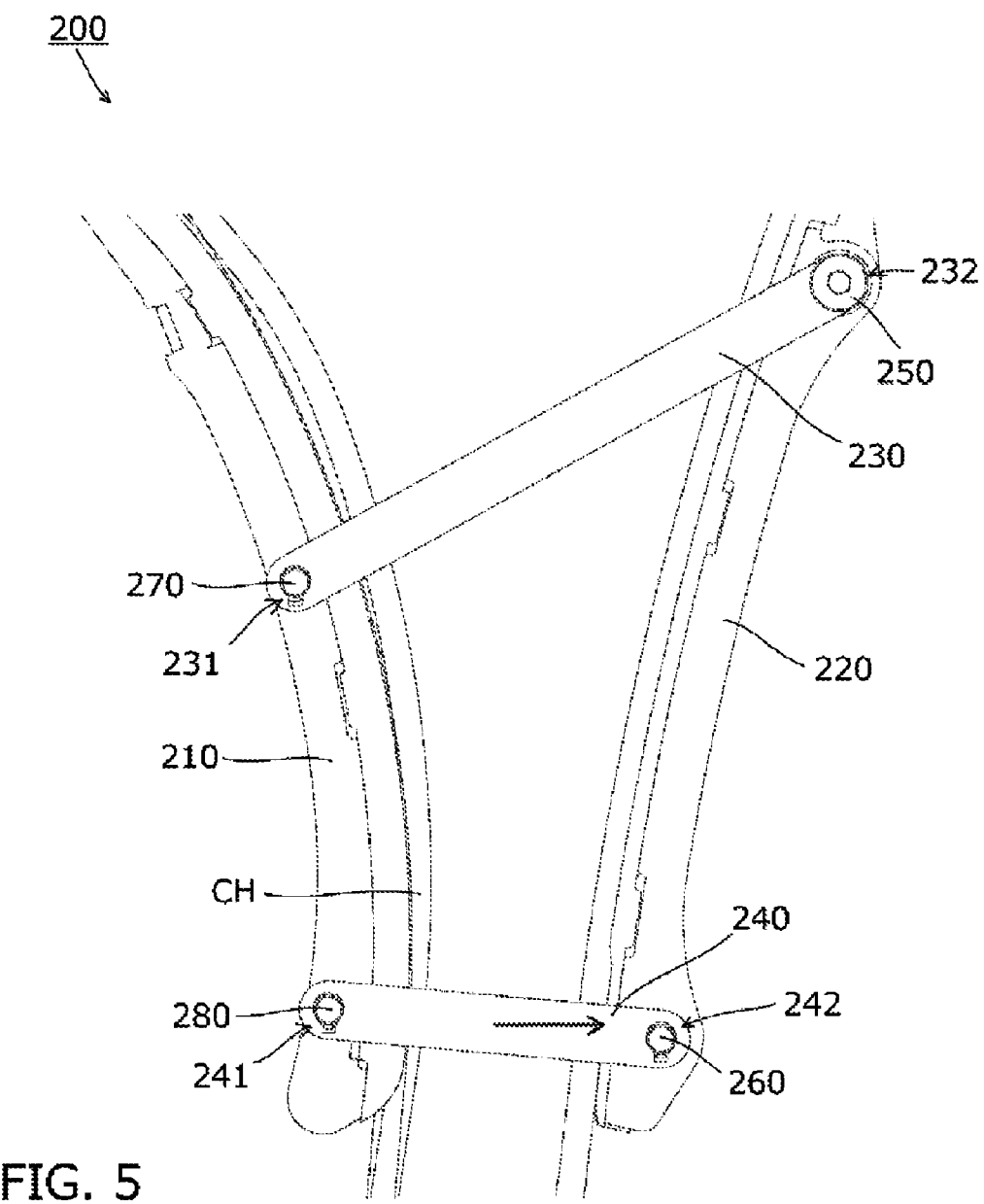
FIG. 5 is an illustrative view showing a condition in which a second link member of the chain guide mechanism according to the second embodiment leans toward a tension side.
Figure 6:
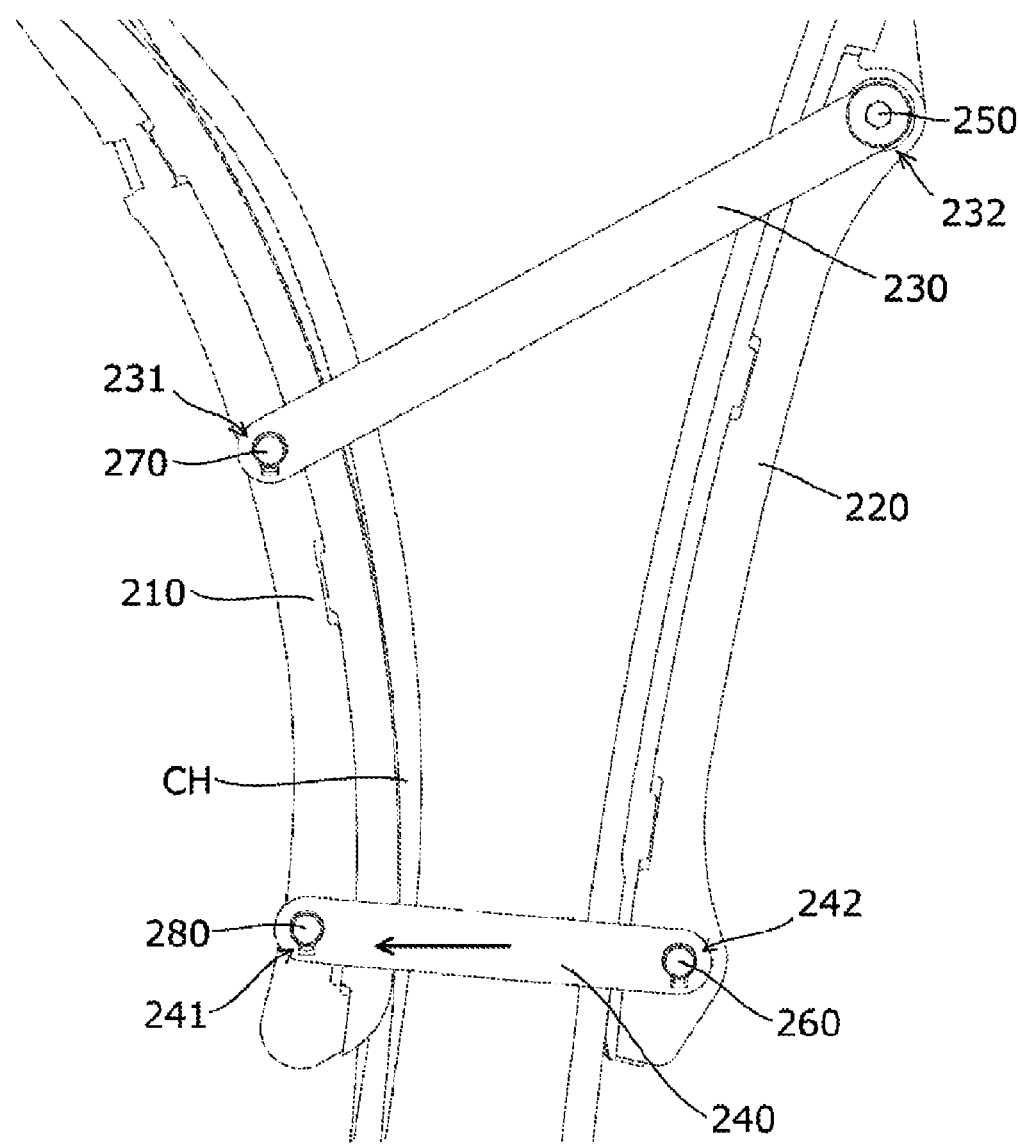
FIG. 6 is an illustrative view showing a condition in which the second link member of the chain guide mechanism according to the second embodiment leans toward a slack side.

Next, a chain guide mechanism 200 according to a second embodiment of the present invention will be described on the basis of FIGS. 4 to 6. Here, the second embodiment differs from the first embodiment described above only in a part of the configuration thereof. Accordingly, reference numerals in the one hundreds used in the description and drawings relating to the first embodiment have been replaced by reference numerals in the two hundreds, and description of identical parts of the configuration have been omitted.

In the chain guide mechanism 100 according to the first embodiment, the tension side lower side shaft member 160 is fixed to the engine block, but in the chain guide mechanism 200 according to the second embodiment, a tension side lower side shaft member 260 is not fixed to the engine block, and instead, a tension side guide 220 is attached to the engine block to be capable of swinging by a tension side upper side shaft member 250.

With the chain guide mechanism 200 according to the second embodiment, obtained in the manner described above, in addition to the effects of the first embodiment, a lower end side of the slack side guide 210 and a lower end side of the tension side guide 220 are capable of moving in a left-right direction, and movement of the lower end side of the slack side guide 210 and the lower end side of the tension side guide 220 is coordinated by the lower side link member 240. Accordingly, the lower end side of the slack side guide 210 and the lower end side of the tension side guide 220 move to the tension side when the tension of the chain CH on the tension side increases, as shown in FIG. 5, and the lower end side of the slack side guide 210 and the lower end side of the tension side guide 220 move to the slack side when the tension of the chain CH on the slack side increases, as shown in FIG. 6. As a result, tension variation can be canceled out by a phase difference between the tension on the slack side and the tension on the tension side.

Further, in the chain guide mechanism 200 according to the second embodiment, the tension side lower side shaft member 260 is not fixed to the engine block, and therefore a shaft member bearing surface need not be formed on the engine block, enabling a reduction in cost.

Next, a chain guide mechanism 300 according to a third embodiment of the present invention will be described on the basis of FIGS. 7 to 9. Here, the third embodiment differs from the first embodiment described above only in a part of the configuration thereof. Accordingly, the reference numerals in the one hundreds used in the description and drawings relating to the first embodiment have been replaced by reference numerals in the three hundreds, and description of identical parts of the configuration have been omitted.

Figure 7:
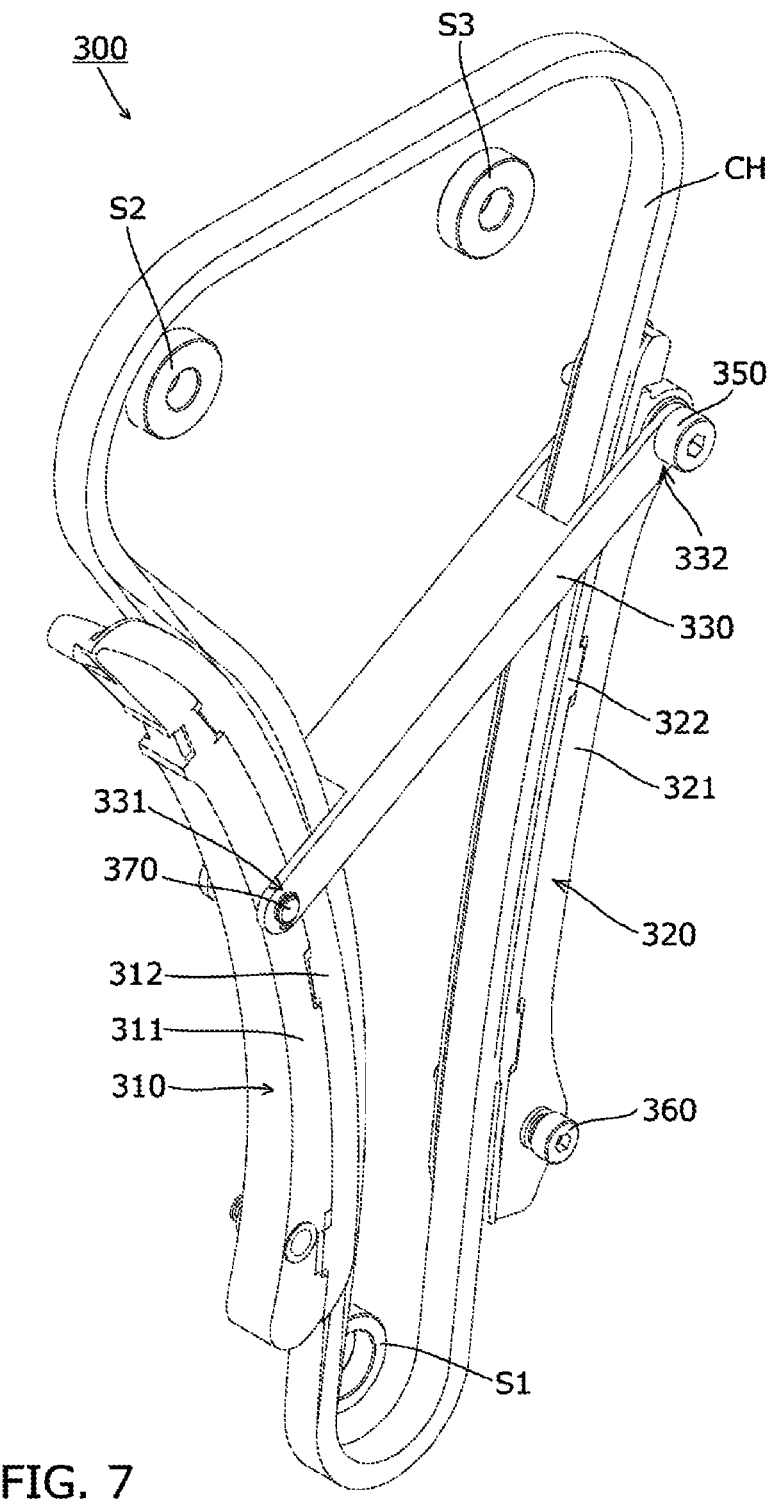
FIG. 7 is a perspective view showing a chain guide mechanism according to a third embodiment.
Figure 8:
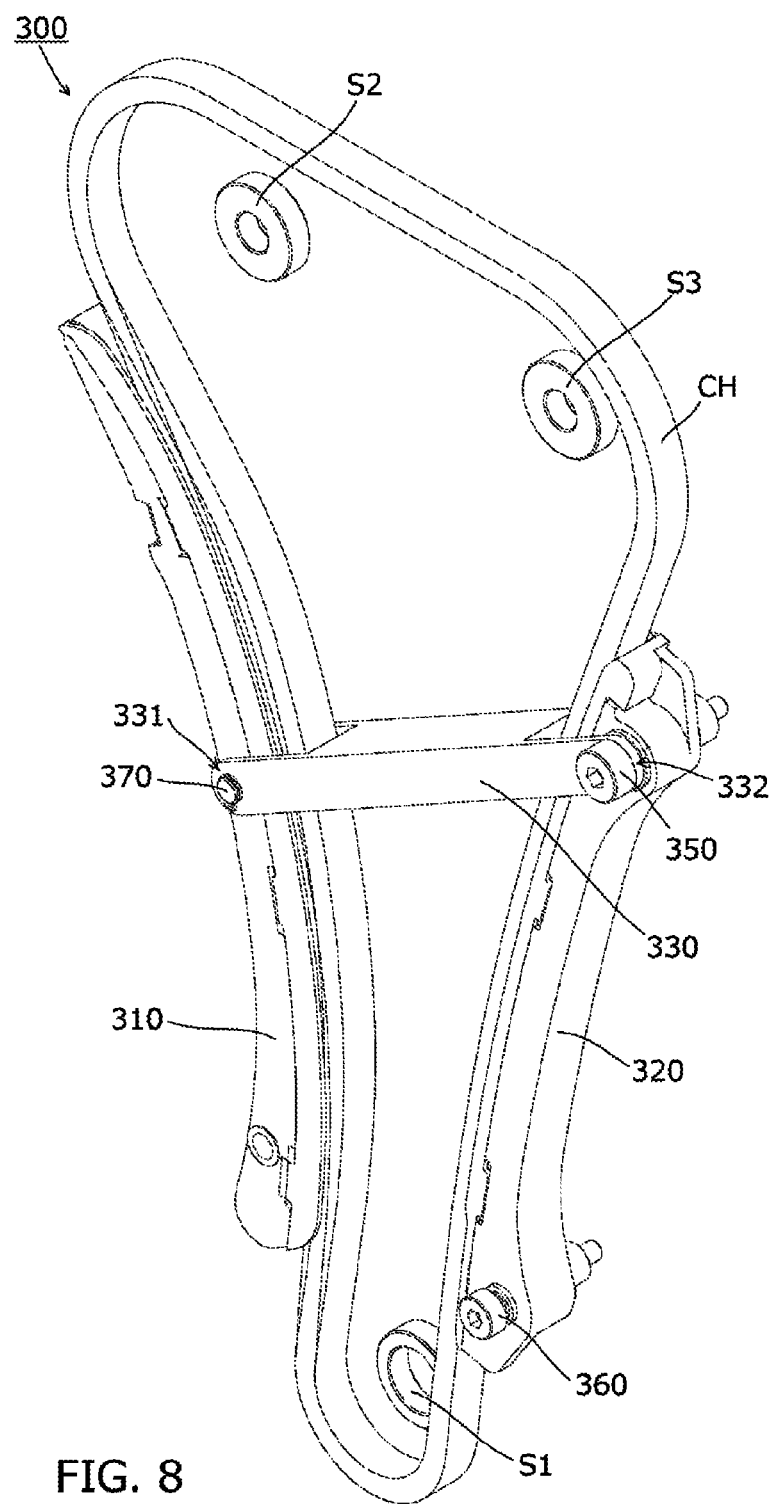
FIG. 8 is a perspective view showing the chain guide mechanism according to the third embodiment from a different angle to FIG. 7.
Figure 9:
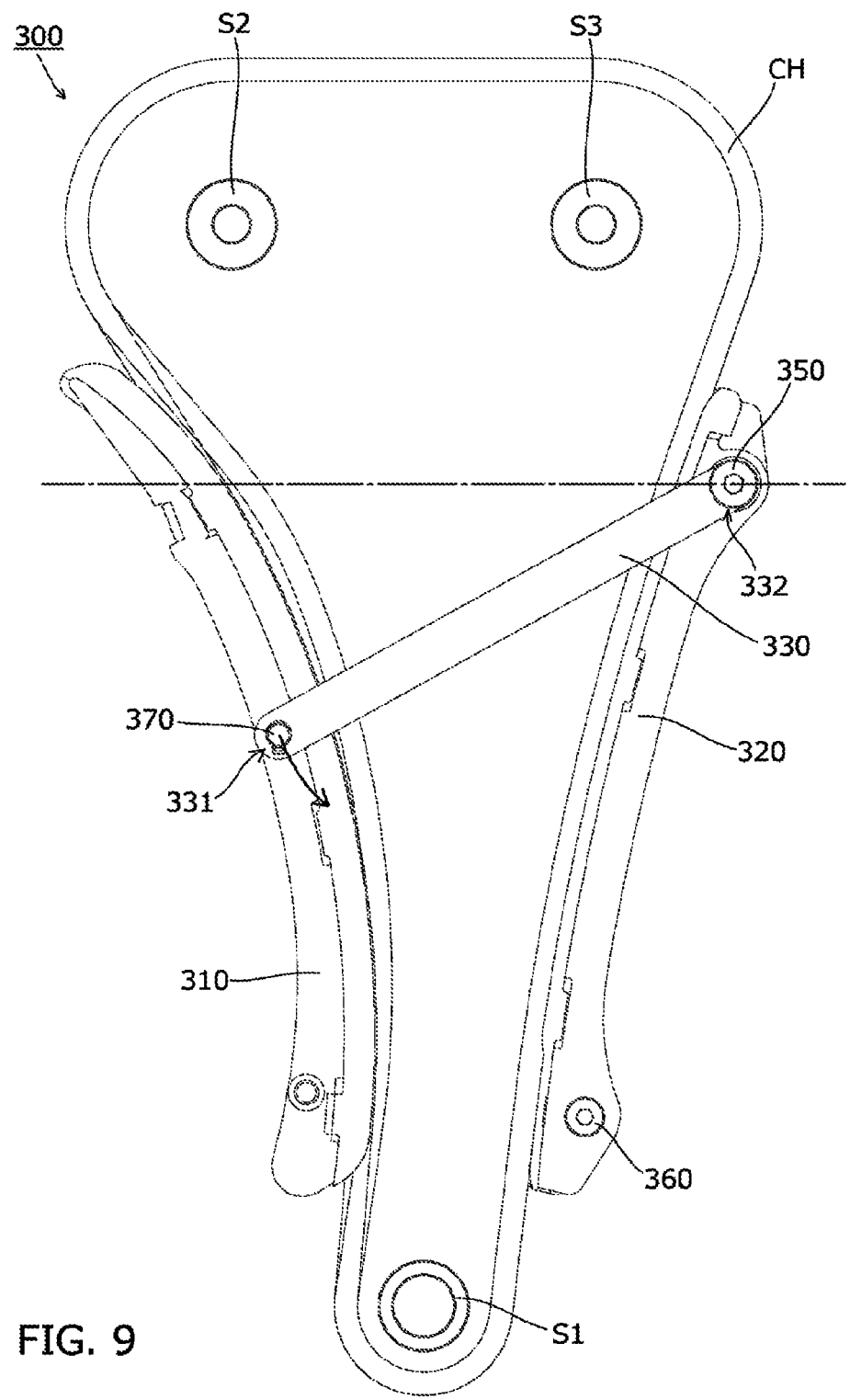
FIG. 9 is a plan view showing the chain guide mechanism according to the third embodiment.

In the chain guide mechanism 300 according to the third embodiment, as shown in FIGS. 7 to 9, the lower side link member 140 of the first embodiment is not provided. As a result, structural simplification and a reduction in cost can be achieved.

Note that in the chain guide mechanism 300 according to the third embodiment, a tension side lower side shaft member 360 is fixed to the engine block, but the tension side lower side shaft member 360 does not have to be fixed to the engine block.

Next, a chain guide mechanism 400 according to a fourth embodiment of the present invention will be described on the basis of FIG. 10. Here, the fourth embodiment differs from the second embodiment described above only in a part of the configuration thereof. Accordingly, the reference numerals in the two hundreds used in the description and drawings relating to the second embodiment have been replaced by reference numerals in the four hundreds, and description of identical parts of the configuration have been omitted.

Figure 10:
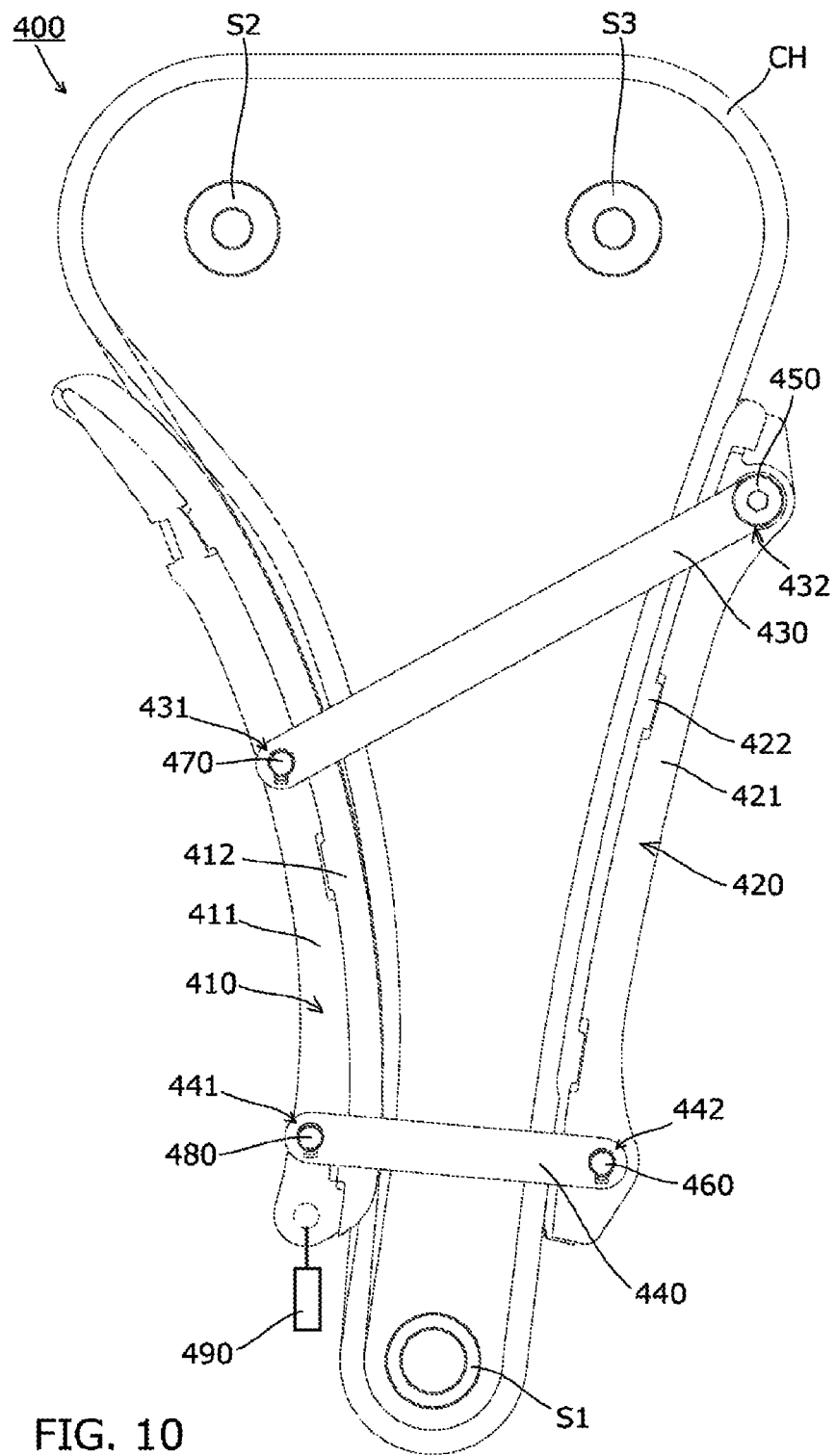
FIG. 10 is a plan view showing a chain guide mechanism according to a fourth embodiment.
Figure 11:
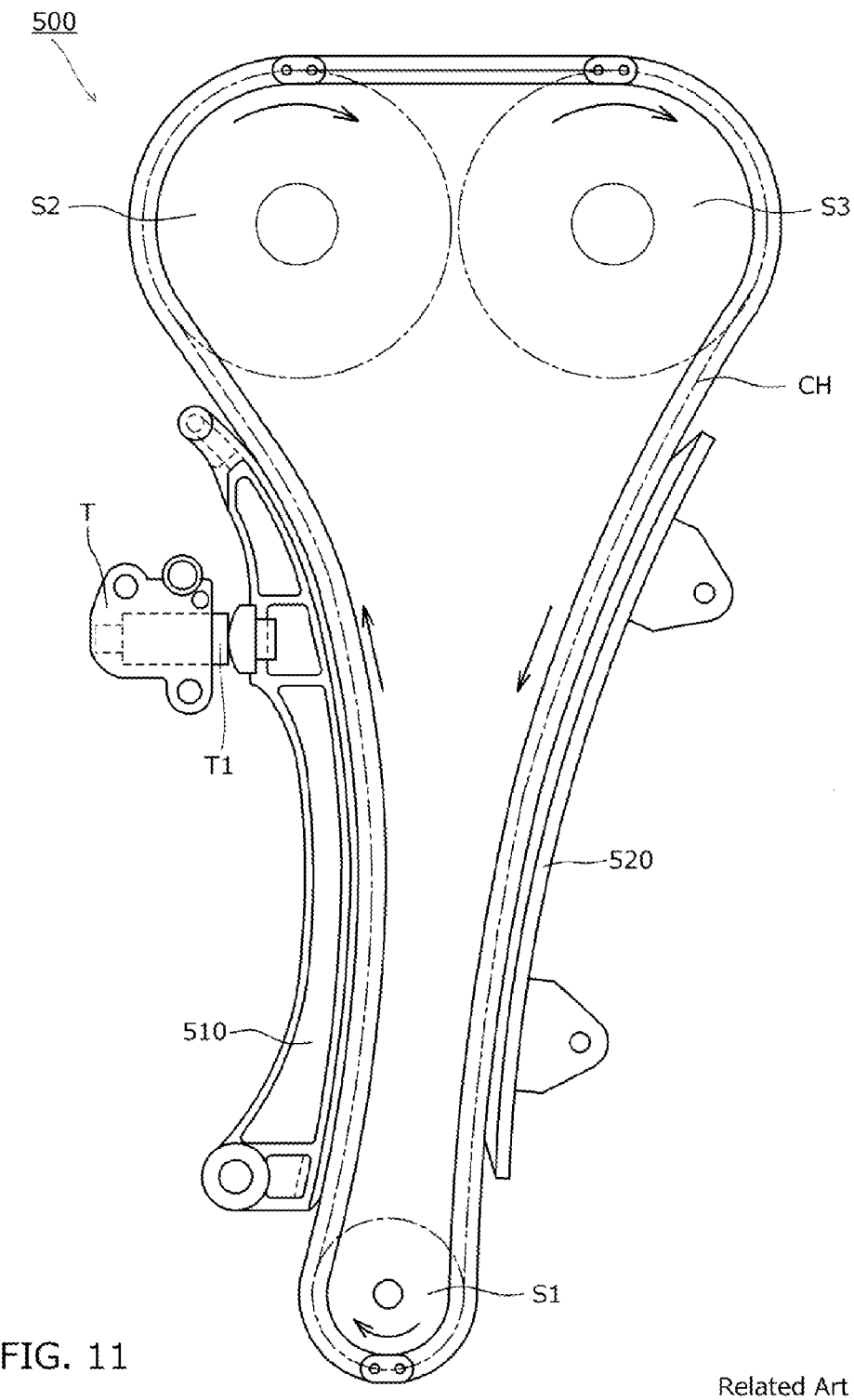
FIG. 11 is a plan view showing a conventional chain guide mechanism.

In the chain guide mechanism 400 according to the fourth embodiment, as shown in FIG. 10, a metal weighting member 490 is attached to the slack side guide 410. Note that a material of the weighting member 490 and a method of attaching the weighting member 490 to the slack side guide 410 may be selected as desired.

Note that in the chain guide mechanism 400 according to the fourth embodiment, a tension side lower side shaft member 460 is not fixed to the engine block, but the tension side lower side shaft member 460 may be fixed to the engine block.

The respective embodiments described above are specific examples of the chain guide mechanism according to the present invention, but the chain guide mechanism according to the present invention is not limited to these embodiments, and shapes, positions, dimensions, positional relationships, and so on of respective constituent members thereof may be modified variously.

For example, the chain guide mechanism according to the above embodiments is provided in an engine as a chain guide mechanism for a timing system, but the present invention is not limited thereto and may be applied to various other devices.

Further, the present invention is not limited to a transmission mechanism using a chain, and may be applied to a similar transmission mechanism using a belt, a rope, or the like, and used widely in various industrial fields.

Furthermore, a chain guide may be configured as desired by combining the respective configurations of the first to fourth embodiments.

Moreover, in FIGS. 3 to 6, 9, and 10, the chain guide mechanism is illustrated such that upper and lower ends of a paper surface correspond to upper and lower ends of the chain guide mechanism in a vertical direction, or in other words such that the timing system is disposed parallel to a vertical plane. However, as long as the slack side guide is biased toward the chain side by the weight of the slack side guide itself, the timing system may be disposed parallel to a surface that is inclined relative to the vertical plane.

What is claimed is:

1. A chain guide mechanism for guiding a chain, comprising:
    a slack side guide disposed on a slack side of a chain travel line;
    a tension side guide disposed on a tension side of said chain travel line;
    a tension side upper side shaft member (150) provided so as to be fixed to an attachment subject of said chain guide mechanism and to attach a fixed portion of said tension side guide (120) to said attachment subject;
    a tension side lower side shaft member provided so as to be fixed to said attachment subject and to attach said tension side guide to said attachment subject in a lower position than said tension side upper side shaft member;
    a link member (130) that is capable of rotating about said tension side upper side shaft member; and,
    a second link member disposed on a lower side of said link member, wherein
    said link member has a tension side pivot portion attached rotatably to said tension side guide and a slack side pivot portion attached rotatably to said slack side guide, wherein the tension side pivot portion is coaxial with the fixed portion,
    said second link member has a second tension side pivot portion attached rotatably to said tension side guide and a second slack side pivot portion attached rotatably to said slack side guide,
    said tension side upper side shaft member is inserted into a shaft hole formed in said tension side pivot portion,
    said tension side lower side shaft member is inserted into a shaft hole formed in said second tension side pivot portion,
    said slack side guide extends in a chain travel direction, and has an upper part than said slack side pivot portion and a lower part than said slack side pivot portion,
    said slack side pivot portion is disposed lower than said tension side upper side shaft member,
    said slack side guide, said tension side guide, said link member, and said second link member configure a four-link mechanisms, and
    said four-link mechanisms is structured such that said slack side guide moves non-parallel with said tension side guide and said upper part of said slack side guide pushes said chain that is guided by said slack side guide, when said slack side guide is biased by a weight thereof toward said chain that is guided by said slack side guide.

2. The chain guide mechanism according to claim 1, further comprising a weighting member attached to said slack side guide.

3. The chain guide mechanism according to claim 1, wherein said slack side pivot portion is substantially near a center of said slack side guide.

* * * * *